US010262653B2

(12) United States Patent
Miyasaka et al.

(10) Patent No.: US 10,262,653 B2
(45) Date of Patent: *Apr. 16, 2019

(54) DEVICE INCLUDING SPEECH RECOGNITION FUNCTION AND METHOD OF RECOGNIZING SPEECH

(71) Applicant: SOCIONEXT INC., Kanagawa (JP)

(72) Inventors: Shuji Miyasaka, Osaka (JP); Kazutaka Abe, Osaka (JP)

(73) Assignee: SOCIONEXT INC., Kanagawa (JP)

( * ) Notice: Subject to any disclaimer, the term of this patent is extended or adjusted under 35 U.S.C. 154(b) by 16 days.

This patent is subject to a terminal disclaimer.

(21) Appl. No.: 15/703,594

(22) Filed: Sep. 13, 2017

(65) Prior Publication Data
US 2018/0005627 A1 Jan. 4, 2018

Related U.S. Application Data

(63) Continuation of application No. 14/750,647, filed on Jun. 25, 2015, now Pat. No. 9,792,902, which is a (Continued)

(30) Foreign Application Priority Data

Dec. 28, 2012 (JP) ................................ 2012-287724

(51) Int. Cl.
*G10L 15/00* (2013.01)
*G10L 15/08* (2006.01)
(Continued)

(52) U.S. Cl.
CPC .............. *G10L 15/08* (2013.01); *G10L 13/00* (2013.01); *G10L 15/22* (2013.01); *G10L 15/28* (2013.01);
(Continued)

(58) Field of Classification Search
CPC ......... G10L 15/00; G10L 15/08; G10L 15/20; G10L 15/22; G10L 15/222; G10L 15/26;
(Continued)

(56) References Cited

U.S. PATENT DOCUMENTS 6,665,645 B1 12/2003 Ibaraki et al.
6,694,018 B1 2/2004 Omori
(Continued)

FOREIGN PATENT DOCUMENTS

JP 02-244099 A 9/1990
JP 03-160499 A 7/1991
(Continued)

OTHER PUBLICATIONS

International Search report issued in corresponding International Patent Application No. PCT/JP2013/004813, dated Nov. 12, 2013, 4 pages with English translation.
(Continued)

*Primary Examiner* — Qi Han
(74) *Attorney, Agent, or Firm* — McDermott Will & Emery LLP

(57) ABSTRACT

A device including a speech recognition function which recognizes speech from a user, includes: a loudspeaker which outputs speech to a space; a microphone which collects speech in the space; a first speech recognition unit which recognizes the speech collected by the microphone; a command control unit which issues a command for controlling the device, based on the speech recognized by the first speech recognition unit; and a control unit which prohibits the command issuance unit from issuing the command, based on the speech to be output from the loudspeaker.

2 Claims, 11 Drawing Sheets

Related U.S. Application Data continuation of application No. PCT/JP2013/004813, filed on Aug. 9, 2013.

(51) Int. Cl.
    *G10L 21/0208*     (2013.01)
    *G10L 13/00*     (2006.01)
    *G10L 15/28*     (2013.01)
    *G10L 17/22*     (2013.01)
    *G10L 15/22*     (2006.01)

(52) U.S. Cl.
    CPC .......... *G10L 17/22* (2013.01); *G10L 21/0208* (2013.01); *G10L 15/222* (2013.01); *G10L 2015/088* (2013.01); *G10L 2015/223* (2013.01); *G10L 2021/02082* (2013.01)

(58) Field of Classification Search
    CPC ..... G10L 15/30; G10L 15/32; G10L 2015/00; G10L 2015/08; G10L 2015/22; G10L 2015/223
    USPC ...................... 704/251, 231, 235, 270.1, 275
    See application file for complete search history.

(56) References Cited

U.S. PATENT DOCUMENTS

| | | |
|---|---|---|
| 2002/0198722 A1 | 12/2002 | Yuschik |
| 2003/0018479 A1 | 1/2003 | Oh et al. |
| 2005/0114141 A1 | 5/2005 | Grody |
| 2008/0144848 A1 | 6/2008 | Buck et al. |
| 2010/0286983 A1* | 11/2010 | Cho .................... B60R 16/0373 704/246 |
| 2010/0308999 A1 | 12/2010 | Chornenky |
| 2012/0253493 A1 | 10/2012 | Andrews |
| 2016/0217783 A1* | 7/2016 | Konuma ............. G10L 15/1822 |

FOREIGN PATENT DOCUMENTS

| | | |
|---|---|---|
| JP | 2000-200099 A | 7/2000 |
| JP | 2001-100785 A | 4/2001 |
| JP | 2001-154694 A | 6/2001 |
| JP | 2003-044069 A | 2/2003 |
| JP | 2006-171077 A | 6/2006 |
| JP | 2008-178087 A | 7/2008 |

OTHER PUBLICATIONS

Written Opinion of the International Searching Authority, issued in corresponding International Patent Application No. PCT/JP2013/004813, dated Nov. 12, 2013; 6 pages with partial English translation.

Non-Final Office Action issued in U.S. Appl. No. 14/750,647, dated Apr. 5, 2016.

Non-Final Office Action issued in U.S. Appl. No. 14/750,647, dated Jul. 15, 2016.

Non-Final Office Action issued in U.S. Appl. No. 14/750,647, dated Jan. 23, 2017.

Notice of Allowance issued in U.S. Appl. No. 14/750,647, dated Jun. 19, 2017.

* cited by examiner

DEVICE INCLUDING SPEECH RECOGNITION FUNCTION AND METHOD OF RECOGNIZING SPEECH

CROSS REFERENCE TO RELATED APPLICATIONS

This is a continuation application of application Ser. No. 14/750,647 filed on Jun. 25, 2015, which is a continuation application of PCT International Application No. PCT/JP2013/004813 filed on Aug. 9, 2013, designating the United States of America, which is based on and claims priority of Japanese Patent Application No. 2012-287724 filed on Dec. 28, 2012. The entire disclosures of the above-identified applications, including the specifications, drawings and claims are incorporated herein by reference in their entirety.

FIELD

The present disclosure relates to devices including a speech recognition function and methods of recognizing speech.

BACKGROUND

Recent years have seen development of electronic devices including a speech recognition function. For example, at the beginning of the year 2012, Samsung Electronics Co., Ltd. released a television (TV) which can be operated using speech recognition.

The TV can be operated by speech from a user (hereinafter, may also be referred to as user speech) in the following manner. The user speaks a keyword which instructs, for example, turning the volume up or down, or selecting a channel. When the speech recognition function included in the TV recognizes the keyword, a command associated with the keyword is issued to the TV, thereby operating the TV.

In this case, the keyword may be output by the TV itself by chance. For example, it is assumed that the speech "channel 10" is the keyword instructing the TV channel to be changed to channel 10. When a person appearing on a TV program on the TV speaks "channel 10" by chance, the speech "channel 10" is output from a loudspeaker of the TV. The output speech is collected by a microphone and recognized, resulting in an unintentional change of the TV channel to channel 10.

Patent Literature (PTL) 1 and PTL 2, for example, disclose techniques to prevent a device from incorrectly operating due to the speech output by the device itself.

When a keyword spoken by a user causes a device to issue a command associated with the keyword, the user speech needs to be accurately recognized. PTL 3, for example, discloses such a technique for accurately recognizing the user speech.

CITATION LIST

Patent Literature

[PTL 1] Japanese Unexamined Patent Application Publication No. 2003-44069
[PTL 2] Japanese Unexamined Patent Application Publication No. 2006-171077
[PTL 3] Japanese Patent No. 4554044

SUMMARY

Technical Problem

However, there is a demand for more accurately preventing a device from incorrectly operating due to the speech output by the device itself.

One non-limiting and exemplary embodiment provides a device including a speech recognition function, which prevents the device from incorrectly operating due to speech output by the device itself.

Solution to Problem

A device including a speech recognition function according to one aspect of the present disclosure is a device including a speech recognition function which recognizes user speech which is speech from a user. The device includes: a loudspeaker which outputs speech to a space; a microphone which collects speech in the space; a first speech recognition unit which recognizes the speech collected by the microphone; a command issuance unit which issues a command for controlling the device including the speech recognition function, based on the speech recognized by the first speech recognition unit; and a control unit which prohibits the command issuance unit from issuing the command, based on the speech to be output from the loudspeaker.

This prevents the device from incorrectly operating due to recognizing the speech output by the device itself by chance without the user's intent. In other words, it is possible to prevent the device from incorrectly operating due to the speech output by the device itself.

These general and specific aspects may be implemented using a system, a method, an integrated circuit, a computer program, or a computer-readable recording medium such as a CD-ROM, or any combination of systems, methods, integrated circuits, computer programs, or computer-readable recording media.

Advantageous Effects

One or more exemplary embodiments or features disclosed herein provide a device including a speech recognition function, which prevents the device from incorrectly operating due to the speech output by the device itself.

BRIEF DESCRIPTION OF DRAWINGS

These and other objects, advantages and features of the invention will become apparent from the following description thereof taken in conjunction with the accompanying drawings that illustrate a specific embodiment of the present invention.

DESCRIPTION OF EMBODIMENTS

Figure 1:
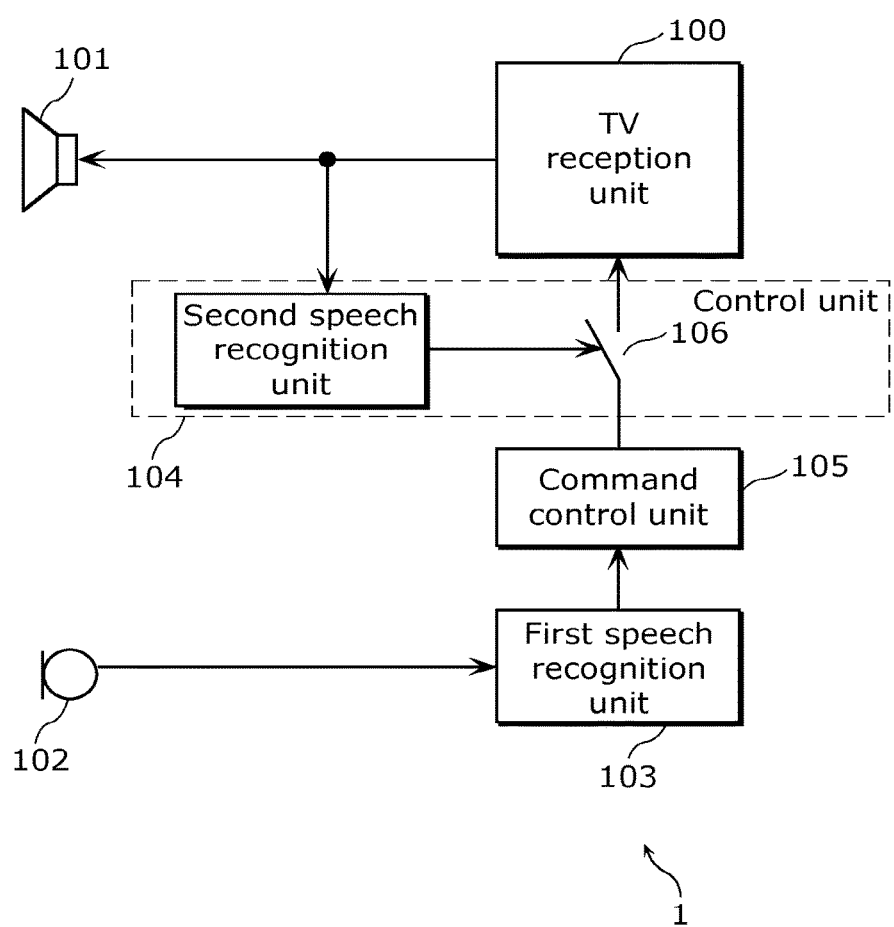
FIG. 1 is a block diagram illustrating a configuration of a device including a speech recognition function according to Embodiment 1.

In order to prevent the device from incorrectly operating due to the speech output by the device itself as described above, a device including a speech recognition function according to one aspect of the present disclosure is a device including a speech recognition function which recognizes user speech which is speech from a user. The device includes: a loudspeaker which outputs speech to a space; a microphone which collects speech in the space; a first speech recognition unit which recognizes the speech collected by the microphone; a command issuance unit which issues a command for controlling the device including the speech recognition function, based on the speech recognized by the first speech recognition unit; and a control unit which prohibits the command issuance unit from issuing the command, based on the speech to be output from the loudspeaker.

This prevents the device from incorrectly operating due to the speech output by the device itself.

Moreover, it may be that the control unit includes a second speech recognition unit which recognizes the speech to be output from the loudspeaker, and that the control unit determines whether or not the speech recognized by the second speech recognition unit matches a predetermined keyword, and when the speech recognized by the second speech recognition unit matches the predetermined keyword, prohibits the command issuance unit from issuing the command.

With this, when the speech output from the loudspeaker is a predetermined keyword, a command for controlling the device itself is not issued. Accordingly, by setting a word associated with a command to a keyword, it is possible to more reliably prevent the device from incorrectly operating due to recognizing the speech output by the device itself by chance without the user's intent.

Moreover, a device including a speech recognition function according to another embodiment of the present disclosure is a device including a speech recognition function which recognizes user speech which is speech from a user. The device includes: at least one loudspeaker which outputs speech to a space; a microphone which collects speech in the space; a speech recognition unit which recognizes the user speech among the speech collected by the microphone; a downsampler which downsamples a speech signal to have a narrower bandwidth, the speech signal being an electric signal of the speech to be output from the at least one loudspeaker; and an echo canceller which estimates, based on the speech signal downsampled, an echo component which is the speech collected by the microphone among the speech output from the at least one loudspeaker, and cancels the echo component estimated, from the speech collected by the microphone. The speech recognition unit recognizes the user speech by recognizing speech from which the echo canceller has canceled the echo component.

With this, the user speech is accurately recognized without being interrupted by the speech output by the device itself. Furthermore, the amount of computation by the echo canceller can be reduced by providing a downsampler in a stage prior to the echo canceller. In other words, accurate speech recognition can be performed with less amount of computation.

Moreover, it may be that the downsampler downsamples the speech signal input to the downsampler, by less than or equal to $(1/N)^{0.5}$, when the at least one loudspeaker comprises N loudspeakers where N is an integer greater than or equal to 2.

With this, even when a loudspeaker of a device supports a multi-channel signal, the user speech can be accurately recognized without being interrupted by the speech signal output by the device itself, with the amount of computation less than or equal to that required in a loudspeaker which supports a monaural-channel signal.

Moreover, the device including the speech recognition function may further include a command issuance unit which issues a command for controlling the device including the speech recognition function, based on the speech recognized by the speech recognition unit. It may be that the speech recognition unit prohibits the command issuance unit from issuing the command based on the echo component, by recognizing speech from which the echo canceller has canceled the echo component.

These general and specific aspects may be implemented using a system, a method, an integrated circuit, a computer program, or a computer-readable recording medium such as a CD-ROM, or any combination of systems, methods, integrated circuits, computer programs, or computer-readable recording media.

Prior to describing a device including a speech recognition function according to each embodiment, devices including a speech recognition function according to Comparative Examples 1 and 2 of the present disclosure will be described.

In order to prevent a device from incorrectly operating due to the speech output by the device itself as described above, as the technique in PTL 1 discloses, a watermark signal may be inserted to a speech signal which is an electric signal of speech to be output from a loudspeaker.

Figure 11A:
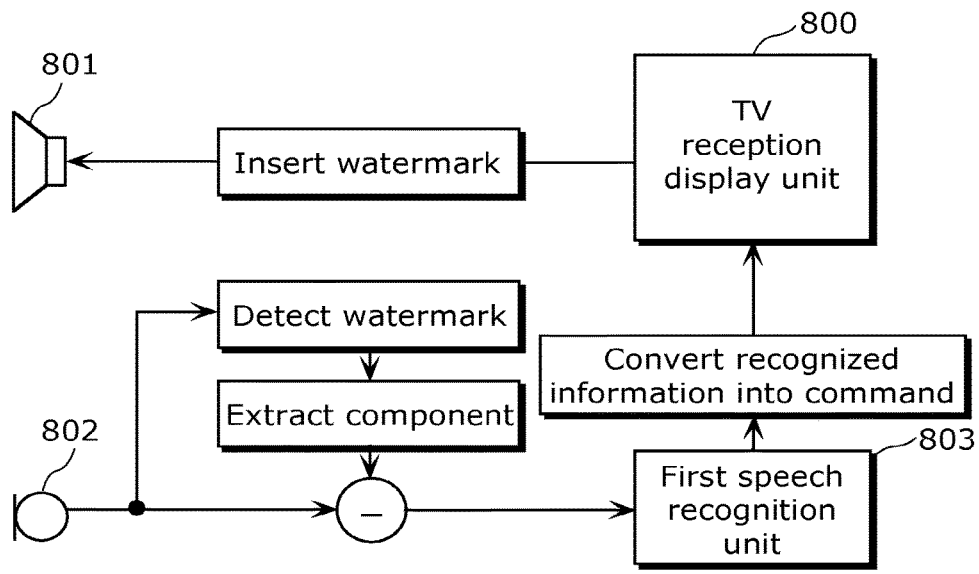
FIG. 11A is a block diagram illustrating a configuration of a device including a speech recognition function according to Comparative Example 1.

FIG. 11A is a block diagram illustrating a configuration of a device including a speech recognition function according to Comparative Example 1 of the present disclosure.

As FIG. 11A illustrates, in the device including the speech recognition function according to Comparative Example 1, a watermark signal is inserted to speech received by a TV reception display unit 800, before the speech is output from a loudspeaker 801. On the other hand, a speech signal of speech collected by a microphone 802 undergoes watermark detection, and undergoes speech recognition by a first speech recognition unit 803. The first speech recognition unit 803 does not perform speech recognition on the speech component for which the watermark signal has been detected. Subsequently, information of the recognition result is converted into a command to the TV reception display unit 800.

The technique disclosed in PTL 2 may be applied to the device including the speech recognition function according to Comparative Example 1.

Figure 11B:
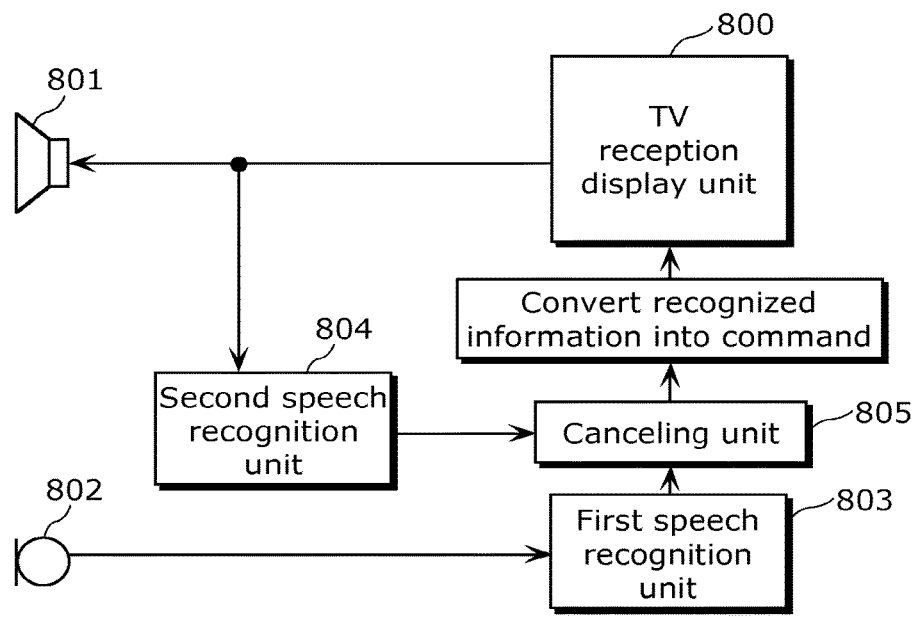
FIG. 11B is a block diagram illustrating a configuration of a device including a speech recognition function according to Variation of Comparative Example 1.

FIG. 11B is a block diagram illustrating a configuration of a device including a speech recognition function according to Variation of Comparative Example 1 to which the technique disclosed in PTL 2 has been applied to the Comparative Example 1.

As FIG. 11B illustrates, in the device including the speech recognition function according to Variation of Comparative Example 1, speech is recognized by a second speech recognition unit 804 before the speech is output from the loudspeaker 801. On the other hand, the speech collected by the microphone 802 is recognized by the first speech recognition unit 803, and the recognition results by the two recognition units (the first speech recognition unit 803 and the second speech recognition unit 804) are compared by a canceling unit 805. The recognition result by the second speech recognition unit 804 is canceled from the recognition result by the first speech recognition unit 803, and the recognition result after the cancellation is converted into a command to the TV reception display unit 800.

PTL 3 discloses a technique for echo cancellation as a technique for improving speech recognition rate.

Figure 12A:
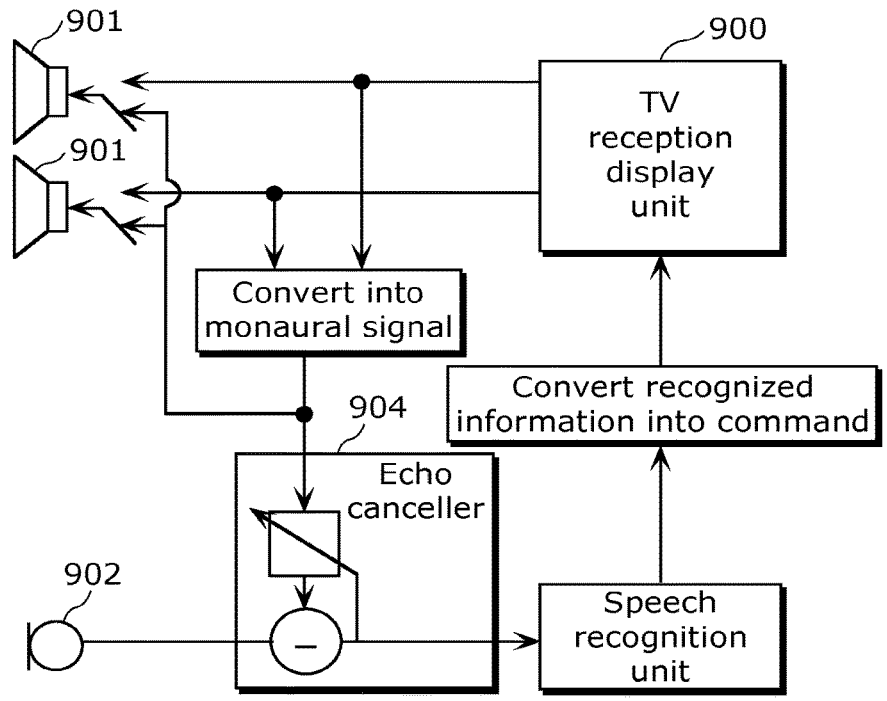
FIG. 12A is a block diagram illustrating an example of a configuration of a device including a speech recognition function according to Comparative Example 2.
Figure 12B:
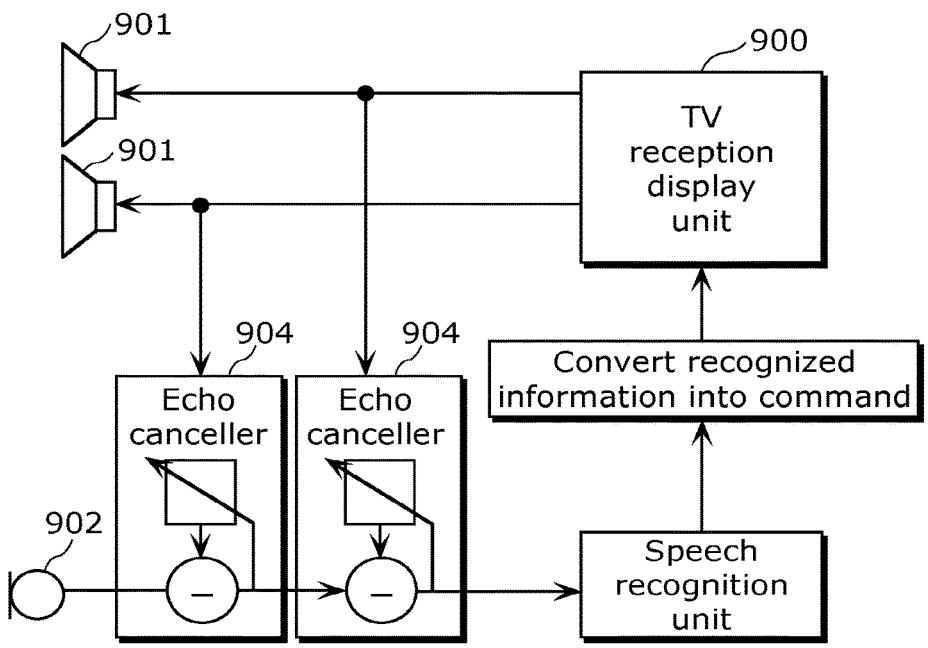
FIG. 12B is a block diagram illustrating another example of the configuration of the device including the speech recognition function according to Comparative Example 2.

FIG. 12A and FIG. 12B each are block diagrams illustrating a configuration of a device including a speech recognition function according to Comparative Example 2 of the present disclosure which includes such an echo canceling function.

As FIG. 12A and FIG. 12B illustrate, the basic idea for echo cancellation is to determine the speech output from loudspeakers 901 and collected by a microphone 902 as echo, and speech recognition is performed on the speech after canceling the echo by an echo canceller 904 included in the device including the speech recognition function. With this, user speech can be recognized without being interrupted by the speech output by the device including the speech recognition function, and the recognition result can be converted into a command to the TV reception display unit 900.

When the speech signal output from the TV reception display unit 900 is a stereo signal, echo cannot be canceled by one echo canceller. Hence, as FIG. 12A illustrates, a signal to be output from the loudspeakers need to be converted into a monaural signal in the speech recognition mode, or as FIG. 12B illustrates, a plurality of echo cancellers need to be used.

In the configuration according to Comparative Example 1, however, a watermark signal multiplexed on a speech signal before the speech signal is output from the loudspeaker 801 is highly likely to be canceled by various noise in the space after the multiplexed signal is output from the loudspeaker 801. Accordingly, causing the microphone side to cancel the speech output by the device including the speech recognition function (for example, TV) is substantially unlikely.

Moreover, the configuration according to Variation of Comparative Example 1 requires complicated processing in which two speech recognition results are analyzed and compared, and then the speech recognition results themselves are altered (canceled).

In the configuration according to Comparative Example 2, when a signal to be output from the loudspeakers 901 is converted into a monaural signal (as in FIG. 12A), the original speech quality is degraded in the speech recognition mode. On the other hand, when the speech output from the loudspeakers 901 remains unchanged as a stereo signal, and a plurality of echo cancellers 904 are used (as in FIG. 12B), the amount of computation by the echo cancellers 904 is significantly large. This is because the amount of computation by the echo cancellers 904 increases in proportion to the square of the frequency band of the speech signal input from the microphone 902. Specifically, a speech signal of TV has a bandwidth of 24 kHz, and a speech signal subject to speech recognition has a bandwidth of 8 kHz at most. In view of this, the amount of computation required by the echo cancellers 904 is nine times (that is, $(24/8)^2$ times) as much as the amount of computation which is originally required (appropriate). In addition, converting into a stereo signal requires double amount of computation.

Hereinafter, embodiments are described in greater detail with reference to the accompanying Drawings.

Each of the embodiments described below shows a general or specific example. The numerical values, structural elements, the arrangement and connection of the structural elements, steps, the processing order of the steps etc. shown in the following embodiments are mere examples, and therefore do not limit the scope of the present disclosure. Therefore, among the structural elements in the following embodiments, structural elements not recited in any one of the independent claims are described as arbitrary structural elements.

Embodiment 1

A device including a speech recognition function according to Embodiment 1 recognizes speech to be output from a loudspeaker, and when the recognized speech matches a predetermined keyword, the device prohibits issuance of a command for controlling the device. This prevents the device including the speech recognition function from incorrectly operating due to the speech output by the device itself.

Hereinafter, a description is given of a device including a speech recognition function according to Embodiment 1 with reference to the accompanying Drawings.

FIG. 1 is a block diagram illustrating a configuration of the device including the speech recognition function according to Embodiment 1. In Embodiment 1, as a device including a speech recognition function 1, a description is given of an example of a TV including a speech recognition function. In other words, the device including the speech recognition function 1 according to Embodiment 1 is a TV including a speech recognition function.

The device including the speech recognition function 1 illustrated in FIG. 1 includes: a TV reception unit 100 which receives a TV signal and generates a speech signal; a loudspeaker 101 which outputs the speech signal into a space as speech; a microphone 102 which collects speech in the space as a speech signal; a first speech recognition unit 103 which recognizes the speech collected by the microphone 102; a second speech recognition unit 104 which recognizes the speech to be output from the loudspeaker 101; a command control unit 105 which converts output information from the first speech recognition unit 103 into a command to the TV reception unit 100; and a switch 106.

Hereinafter, a configuration of the device including the speech recognition function 1 will be specifically described.

The TV reception unit 100 is, for example, a tuner, which receives a TV signal including a video signal and a speech signal transmitted from outside of the device including the speech recognition function 1. The TV reception unit 100 outputs a speech signal included in the received TV signal to the loudspeaker 101, and outputs a video signal included in the received TV signal to an image display unit (not illustrated) such as a liquid crystal panel. The TV reception unit 100, for example, switches between reception channels according to a command provided from the command control unit 105.

The loudspeaker 101 converts a speech signal which is an electric signal output from the TV reception unit 100 into physical vibration to generate speech which is air vibration. In other words, the loudspeaker 101 outputs speech corresponding to the speech signal to a space.

The microphone 102 converts speech into a physical signal to generate a speech signal which is an electric signal. In other words, the microphone 102 collects speech.

The first speech recognition unit 103 recognizes the speech collected by the microphone 102. Specifically, the first speech recognition unit 103 recognizes the speech collected by the microphone 102 by analyzing the speech signal output from the microphone 102. The first speech recognition unit 103 outputs information indicating the recognized speech to the command control unit 105.

The second speech recognition unit 104 recognizes speech to be output from the loudspeaker 101 by analyzing a speech signal that is before being output from the loudspeaker 101. When the recognized speech matches a predetermined keyword, the second speech recognition unit 104 turns off the switch 106. In other words, the second speech recognition unit 104 prohibits the command control unit 105 from issuing a command to the TV reception unit 100. For example, the second speech recognition unit 104 includes a storage unit for storing keywords registered by a user. When the recognized speech is stored in the storage unit, the second speech recognition unit 104 determines that the recognized speech matches a predetermined keyword, and turns off the switch 106.

The command control unit 105 generates a command in accordance with the speech recognized by the first speech recognition unit 103. In other words, the command control unit 105 converts the speech recognized by the first speech recognition unit 103 into a command. Specifically, when the speech recognized by the first speech recognition unit 103 is a predetermined keyword, the command control unit 105 generates a command associated with the keyword, and issues the generated command to the TV reception unit 100 via the switch 106. For example, the command control unit 105 includes a storage unit storing commands and information indicating predetermined keywords associated with the commands. When the speech recognized by the first speech recognition unit 103 matches any one of the keywords stored in the storage unit, the command control unit 105 issues a command associated with the matched keyword.

The switch 106 switches between issuance and non-issuance of the command converted by the command control unit 105 to the TV reception unit 100, by turning on and off according to an instruction from the second speech recognition unit 104. Specifically, the switch 106 turns off when the speech recognized by the second speech recognition unit 104 matches a predetermined keyword, and turns on when no match is found. In other words, the second speech recognition unit 104 and the switch 106 prohibit the command control unit 105 from issuing a command, based on the speech to be output from the loudspeaker 101.

Next, operations of the device including the speech recognition function 1 configured as above will be described.

Figure 2:
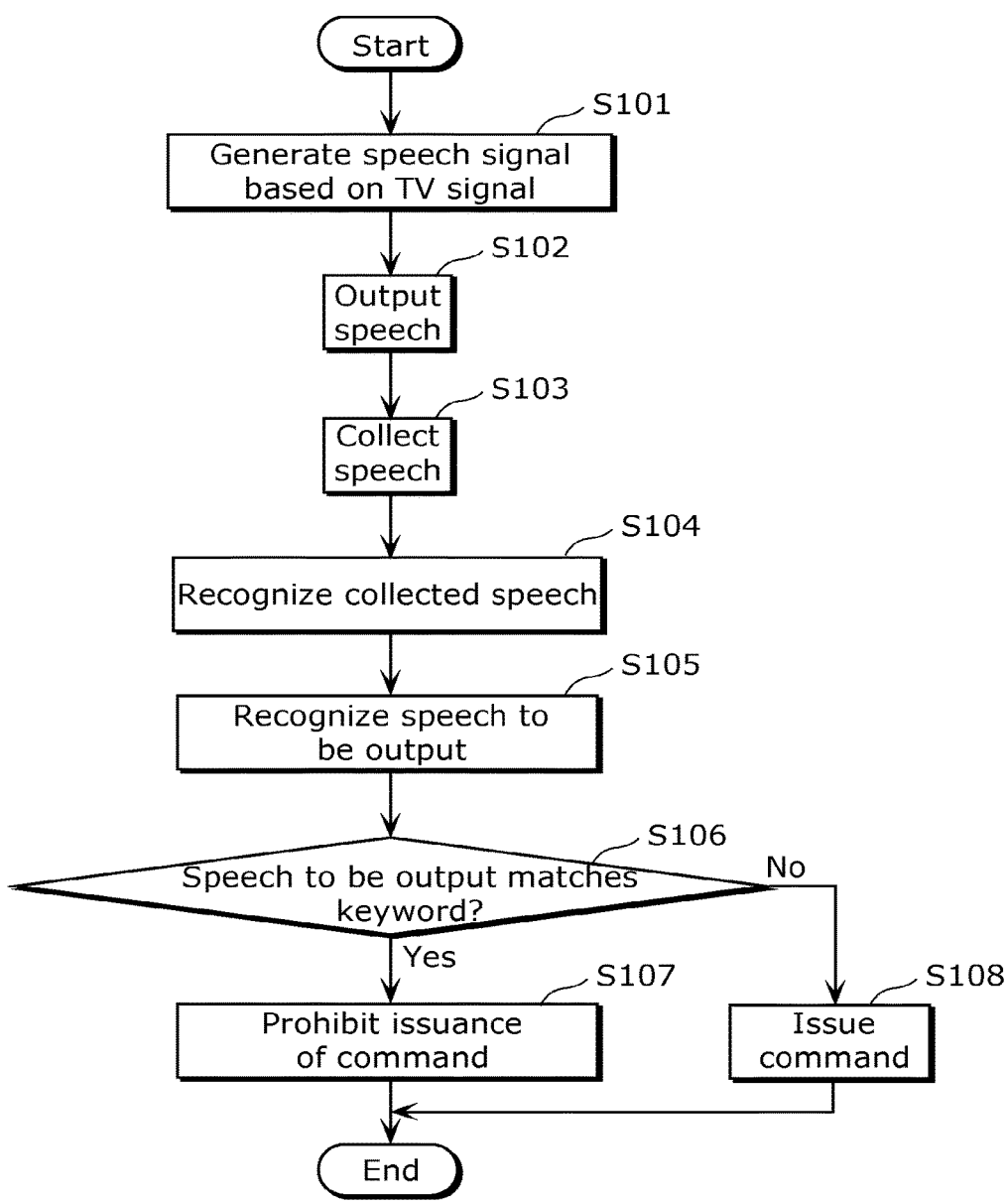
FIG. 2 is a flowchart illustrating operations of the device including the speech recognition function.

FIG. 2 is a flowchart illustrating operations of the device including the speech recognition function 1 according to Embodiment 1.

First, the TV reception unit 100 receives a TV signal, and generates a speech signal based on the received TV signal (S101).

The speech signal thus generated is output to a space by the loudspeaker 101 (S102). Specifically, the loudspeaker 101 converts the speech signal generated by the TV reception unit 100 into speech which is air vibration, and outputs the speech to the space.

A speech signal, which is in the space and which includes the speech signal output to the space from the loudspeaker 101, is collected by the microphone 102 (S103). Specifically, the microphone 102 converts speech which is air vibration in the space into a speech signal which is an electric signal. In other words, the microphone 102 collects speech.

The speech signal collected by the microphone 102 is recognized by the first speech recognition unit 103 (S104). Specifically, the first speech recognition unit 103 recognizes the speech collected by the microphone 102 by analyzing the speech signal output from the microphone 102. The first speech recognition unit 103 outputs information indicating the recognized result to the command control unit 105.

On the other hand, the speech signal before being output from the loudspeaker 101 is recognized by the second speech recognition unit 104 (S105).

Here, as described above, the command control unit 105 issues a predetermined command to the TV reception unit 100 based on the output information from the first speech recognition unit 103. When the output information from the second speech recognition unit 104 matches a predetermined keyword, the control unit including the second speech recognition unit 104 and the switch 106 performs control such that the command control unit 105 does not issue a command to the TV reception unit 100.

Specifically, after the second speech recognition unit 104 recognizes speech to be output from the loudspeaker 101 (after S105), the second speech recognition unit 104 determines whether or not the speech to be output from the loudspeaker 101 matches a predetermined keyword (S106). When a match is found (Yes in S106), the switch 106 is turned off to prohibit the command control unit 105 from issuing a command to the TV reception unit 100 (S107). On the other hand, when no match is found (No in S106), the switch 106 is kept on to cause the command control unit 105 to issue a command to the TV reception unit 100 (S108). In other words, issuance of a command from the command control unit 105 to the TV reception unit 100 is permitted.

In this way, when the speech output from the device including the speech recognition function 1 matches a predetermined keyword, the command control unit 105 does not issue a command indicated by the keyword, to the TV reception unit 100. This reduces an incorrect operation of the device including the speech recognition function 1 caused due to the speech output by the device 1 itself.

For example, it is assumed that when the first speech recognition unit 103 recognizes the words "channel 10", the command control unit 105 is set to issue, to the TV reception unit 100, a command for changing the reception channel to channel 10. In other words, it is assumed that the words "channel 10" are a keyword for issuing a command for changing the reception channel to channel 10.

In this case, if a person appearing on the TV program being received speaks "channel 10" by chance, the loudspeaker 101 outputs the speech signal of "channel 10", the keyword is collected by the microphone 102, and recognized by the first speech recognition unit 103. Here, since the second speech recognition unit 104 recognizes the speech signal to be output to the loudspeaker 101, the second speech recognition unit 104 also recognizes the keyword "channel 10". In this case, it can be determined that the keyword "channel 10" recognized by the first speech recognition unit 103 is the speech which has been output from the loudspeaker 101 and which has been recognized by the first speech recognition unit 103, and that the keyword "channel 10" is thus not a speech instruction from the user. Accordingly, the device including the speech recognition function 1 does not change the channel to channel 10.

In other words, when the second speech recognition unit 104 recognizes the keyword "channel 10", that is, when the recognition result by the second speech recognition unit 104 matches the recognition result by the first speech recognition unit 103, the second speech recognition unit 104 operates as described below. Specifically, the second speech recognition unit 104 turns off the switch 106 to prohibit the command control unit 105 from issuing a command to the TV reception unit 100. Accordingly, a command instructing the TV reception unit 100 to change the channel to channel 10 is not issued to the TV reception unit 100.

In contrast, when the second speech recognition unit 104 does not recognize the keyword "channel 10", that is, when the recognition result by the second speech recognition unit 104 does not match the recognition result by the first speech recognition unit 103, the second speech recognition unit 104 operates as described below. Specifically, the second speech recognition unit 104 keeps the switch 106 on to permit the command control unit 105 to issue a command to the TV reception unit 100. Accordingly, a command instructing the TV reception unit 100 to change the channel to channel 10 is issued from the command control unit 105 to the TV reception unit 100. Accordingly, the device including the speech recognition function 1 changes the channel to channel 10.

As described above, even if the first speech recognition unit 103 recognizes a keyword associated with a command, the device including the speech recognition function 1 determines that the keyword recognized by the first speech recognition unit 103 is not a speech instruction from the user when the second speech recognition unit 104 recognizes the same keyword, and the device 1 does not operate according to the command associated with the keyword. On the other hand, when the second speech recognition unit 104 does not recognize the keyword which is the same as the one recognized by the first speech recognition unit 103, the device 1 determines that the keyword recognized by the first speech recognition unit 103 is a speech instruction from the user, and operates according to the command associated with the keyword.

In other words, when the recognition result by the second recognition unit 104 matches a predetermined keyword, the second speech recognition unit 104 turns off the switch 106 to prohibit the command control unit 105 from issuing a command to the TV reception unit 100. Accordingly, when the keyword recognized by the second speech recognition unit 104 matches a predetermined keyword, the device including the speech recognition function 1 does not operate according to the command indicated by the keyword.

The keyword "channel 10" above is a mere example, and any keywords may be used instead. A command does not have to be issued to the TV reception unit 100. For example, a command may be issued to an image display unit which displays an image according to an image signal of a TV signal received by the TV reception unit 100. Specifically, it may be that keywords such as "brighten" and "darken" are used so that the command control unit 105 issues a command for controlling the image display unit according to such keywords. Alternatively, it may be that keywords such as "turn the volume up" and "turn the volume down" are used so that a command is issued for controlling the loudspeaker 101 according to such keywords.

The speech signal input to the second speech recognition unit 104 does not have to be a signal which is immediately before being output from the loudspeaker 101, but may be a speech signal in one of stages from when the speech signal is received and reproduced by the TV reception unit 101 to when the speech signal is output from the loudspeaker 101. When the speech signal is an analog signal, of course, the signal is converted to a digital signal by an analog to digital (AD) converter in one of stages before the signal is input to the second speech recognition unit 104.

As described above, the device including the speech recognition function 1 according to Embodiment 1 includes: the loudspeaker 101 which outputs speech to a space; the microphone 102 which collects speech in the space; the first speech recognition unit 103 which recognizes the speech collected by the microphone 102; the second speech recognition unit 104 which recognizes the speech to be output from the loudspeaker 101; the command control unit 105 which issue a command for controlling the device 1, based on the speech recognized by the first recognition unit; and the switch 106. The second speech recognition unit 104 and the switch 106 prohibit the command control unit 105 from issuing a command, based on the speech to be output from the loudspeaker 101. The command control unit 105 corresponds to the command issuing unit, and the second speech recognition unit 104 and the switch 106 correspond to the control unit.

This prevents the device including the speech recognition function 1 from incorrectly operating due to the speech output by the device 1 itself.

Specifically, when the output information which is the speech recognition result by the second speech recognition unit 104 does not match a specific keyword, a command associated with the keyword is issued to the TV reception unit 100. When the output information matches the specific keyword, a command associated with the output information which is the speech recognition result by the first speech recognition unit 103 is not issued. In other words, the second speech recognition unit 104 recognizes speech to be output from the loudspeaker 101, and determines whether the recognized speech matches a predetermined keyword. When a match is found, the second speech recognition unit 104 turns off the switch 106 to prohibit the command control unit 105 from issuing a command to the TV reception unit 100.

With this, when the speech output from the loudspeaker 101 is a predetermined keyword, a command for controlling the device including the speech recognition function 1 is not issued. Accordingly, by setting speech associated with a command to a keyword, it is possible to prevent the speech output by chance by the device including the speech recognition function 1 without user's intent from being recognized and resulting in an unintended operation. In other words, an incorrect operation of the device 1 can be prevented more reliably.

In Embodiment 1, when the speech recognition result by the second speech recognition unit 104 matches a predetermined keyword, the second speech recognition unit 104 turns off the switch 106 to prohibit the command control unit 105 from issuing a command to the TV reception unit 100. However, the issuance of a command to the TV reception unit 100 may be prohibited in other ways. For example, it may be that the device including the speech recognition function 1 does not include the switch 106, and when the speech recognition result by the second speech recognition unit 104 matches a predetermined keyword, issuance of a command to the TV reception unit 100 may be prohibited by stopping generation of a command by the command control unit 105.

Embodiment 2

A device including a speech recognition function according to Embodiment 2 downsamples a speech signal, which is an electric signal of speech to be output from a loudspeaker, to have a narrower bandwidth, and cancels, from the speech collected by a microphone, an echo component which is the speech collected by the microphone among the speech output from the loudspeaker. Accordingly, the device including the speech recognition function can perform speech recognition without being interrupted by a speech signal output by the device itself, with less amount of computation.

Hereinafter, a description is given of the device including the speech recognition function according to Embodiment 2 with reference to the accompanying Drawings.

Figure 3:
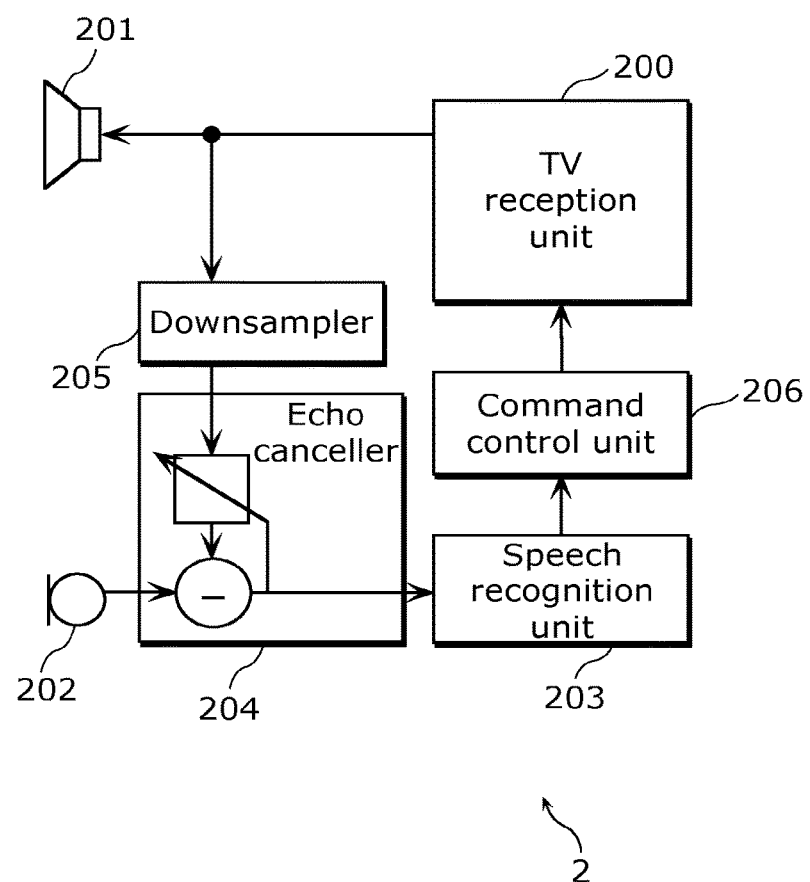
FIG. 3 is a block diagram illustrating a configuration of a device including a speech recognition function according to Embodiment 2.

FIG. 3 is a block diagram illustrating a configuration of the device including the speech recognition function according to Embodiment 2. In Embodiment 2, as a device including a speech recognition function 2, a description is given of an example of a TV including a speech recognition function.

The device including the speech recognition function 2 illustrated in FIG. 3 includes: a TV reception unit 200 which receives a TV signal and generates a speech signal; a loudspeaker 201 which outputs a speech signal having a wide bandwidth into the space; a microphone 202 which collects speech signal in the space; a speech recognition unit 203 which recognizes the speech signal collected by the microphone 202; an echo canceller 204 which cancels, from the speech collected by the microphone 202, an echo component which is the speech output from the loudspeaker 202 and collected by the microphone 202; a downsampler 205 which downsamples the speech signal to be output from the loudspeaker 201 to have a narrower bandwidth; and a command control unit 206 which issues a command for controlling the device 2, based on output information from the speech recognition unit 203.

In FIG. 3, the TV reception unit 200, the loudspeaker 201, the microphone 202, the speech recognition unit 203, and the command control unit 206 are the same as the TV reception unit 100, the loudspeaker 101, the microphone 102, the first speech recognition unit 103, and the command control unit 105 in FIG. 1.

As described above, the device including the speech recognition function 2 according to Embodiment 2 is different from the device including the speech recognition function 1 according to Embodiment 1 in that the downsampler 205 and the echo canceller 204 are included instead of the control unit. The downsampler 205 downsamples a speech signal, which is an electric signal of speech to be output from the loudspeaker, to have a narrower bandwidth. The echo canceller 204 estimates an echo component which is the speech collected by the microphone 202 among the speech output from the loudspeaker 201, and cancels the estimated echo component from the speech collected by the microphone 202. The speech recognition unit 203 recognizes the user speech by recognizing speech from which the echo canceller has canceled the echo component.

Next, operations of the device including the speech recognition function 2 configured as above will be described.

Figure 4:
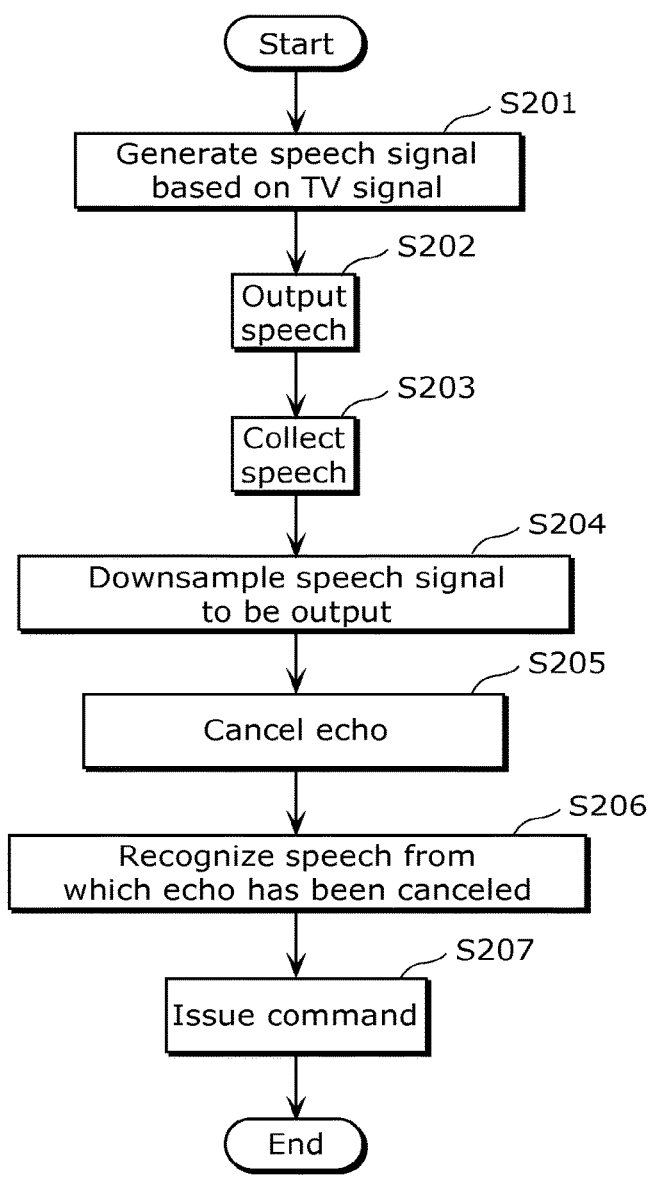
FIG. 4 is a flowchart illustrating operations of the device including the speech recognition function.

FIG. 4 is a flowchart illustrating operations of the device including the speech recognition function 2 according to Embodiment 2.

First, the TV reception unit 200 receives a TV signal, and generates a speech signal based on the received TV signal (S201). In recent years, the reproduction bandwidth of the speech of a TV signal is a wide bandwidth of approximately 24 kHz. The speech signal thus generated is output to a space by the loudspeaker 201 (S202). In other words, the frequency bandwidth of the speech output to the space is approximately 24 kHz.

Speech, which is in the space and which includes the speech output to the space from the loudspeaker 201, is collected by the microphone 202 (S203). Specifically, the microphone 202 samples speech in the space, for example, at a sampling frequency of 8 kHz, and collects the speech. Specifically, the frequency bandwidth of the speech signal output from the microphone 202 to the echo canceller 204 is 8 kHz. In other words, the frequency bandwidth of the speech signal collected by the microphone 202 has been downsampled to 8 kHz.

A wideband speech signal to be output from the loudspeaker 201 is input to the downsampler 205, and is converted into a speech signal having a narrower bandwidth. In other words, the downsampler 205 downsamples the speech signal to be output from the loudspeaker 201 (S204). Specifically, the downsampler 205 makes the bandwidth of the speech signal to be output from the loudspeaker 201 to be narrower by canceling a signal having a frequency bandwidth unnecessary for speech recognition from among the speech signal to be output from the loudspeaker 201. More specifically, the frequency bandwidth necessary for speech recognition is 8 kHz at most. Hence, for example, when the frequency band of the speech signal to be output from the loudspeaker 201 is 24 kHz, the downsampler 205 downsamples the frequency band of the speech signal input to the downsampler to 8 kHz which is ⅓ of the frequency band of the input speech signal, and outputs the downsampled signal to the echo canceller 204.

The speech signal input to the downsampler 205 need not always be a signal immediately before being output from the loudspeaker 201, but may be a speech signal in one of stages from when a speech signal is received and reproduced by the TV reception unit 201 to when the speech signal is output from the loudspeaker 201. When the speech signal is an analog signal, of course, the signal is converted to a digital signal by an analog to digital (AD) converter in one of stages before the signal is input to the downsampler 205.

Next, the speech signal collected by the microphone 202 and the output signal of the downsampler 205 are input to the echo canceller 204. The echo canceller 204 cancels, from the speech signal collected by the microphone 202, an echo component output from the loudspeaker 201 and collected by the microphone 202. In other words, echo is canceled (S205). Specifically, the echo canceller 204 estimates an echo component which is speech collected by the microphone 202 among the speech output from the loudspeaker 201, based on the speech signal downsampled by the downsampler 205, and cancels the estimated echo component from the speech collected by the microphone 202. Specifically, the echo canceller 204 cancels the speech signal of the echo component from the speech signal output from the microphone 202, and outputs the speech signal after the cancellation to the speech recognition unit 203.

The echo cancelling method performed by the echo canceller 204 may be any conventional echo cancelling methods.

Finally, the output signal from the echo canceller 204 is input to the speech recognition unit 203 for speech recognition. The command control unit 206 issues a command for controlling the device 2 according to the output information from the speech recognition unit 203. Specifically, the speech recognition unit 203 recognizes the speech signal on which echo cancelling has been performed (S206), and the command control unit 206 issues a command to the TV reception unit 200 according to the output information which is the speech recognition result by the speech recognition unit 203 (S207).

As described above, in the device including the speech recognition function 2 according to Embodiment 2, the downsampler 205 downsamples the speech signal, which is an electric signal of speech to be output from the loudspeaker 201, to have a narrower bandwidth. The echo canceller 204 cancels, from the speech collected by the microphone 202, an echo component which is speech collected by the microphone 202 among the speech output from the loudspeaker 201, based on the speech signal downsampled by the downsampler 205.

As described above, the device including the speech recognition function 2 according to Embodiment 2 can provide advantageous effects as described below, by using the echo canceller 204.

For example, it is assumed that the words "channel 10" is a keyword for issuing a command for changing the reception channel to channel 10. Here, in the case where the user instructs the change of the channel by speaking "channel 10" and at the same time the TV itself outputs the speech of the TV program loud, the words "channel 10" spoken by the user and the speech from the TV program are mixed and collected by the microphone 202.

If the echo canceller 204 is not included, the speech recognition unit 203 receives the mixed speech signal. As a result, it is interrupted that the speech recognition unit 203 recognizes the keyword "channel 10" accurately.

In contrast, the device including the speech recognition function 2 according to Embodiment 2 includes the echo canceller 204, which allows the echo component output from the loudspeaker 201 and collected by the microphone 202 to be canceled from the speech signal collected by the microphone 202. As a result, the device including the speech recognition function 2 according to Embodiment 2 can accurately recognize user speech.

Moreover, as described above, any of the speech signals input to the echo canceller 204 has a bandwidth narrower than that of the signal to be output from the loudspeaker 201 to the space. In other words, the speech signal input from the loudspeaker 201 side to the echo canceller 204, and the speech signal input from the microphone 202 side to the echo canceller 204 have a bandwidth narrower than that of the speech signal to be output from the loudspeaker 201. Accordingly, advantageous effects as described above can be provided.

When the speech signal input to the echo canceller 204 is not narrow banded, the input speech signal has a bandwidth of 24 kHz, but the frequency bandwidth of the speech signal subject to speech recognition is 8 kHz at most. Hence, when the speech signal input to the echo canceller 204 is not narrow banded, the amount of computation by the echo canceller 204 increases by 9 times (that is (24/8)^2 times) of the amount of computation originally required for speech recognition.

In contrast, the device including the speech recognition function 2 according to Embodiment 2 includes the downsampler 205 and the microphone 202 which performs downsampling. This allows the frequency bandwidth of any speech signals input to the echo canceller 204 to be narrower. Accordingly, the amount of computation by the echo canceller 204 can be reduced.

The method of narrowbanding the speech signal input from the microphone 202 side to the echo canceller 204 may be achieved by using the microphone 202 of a narrow bandwidth which can perform processing in a similar manner to that in Embodiment 2, or by downsampling the speech signal collected by a microphone of a wide bandwidth into a speech signal having a narrower band.

The downsampler 205 downsamples the speech signal, which is an electric signal to be output from the loudspeaker 201, to have a frequency bandwidth that can be recognized by the speech recognition unit 203. Accordingly, decrease in speech recognition rate by the speech recognition unit 203 is reduced.

As described above, the device including the speech recognition function 2 according to Embodiment 2 is a device including a speech recognition function which recognizes user speech which is speech from a user. The device includes: the loudspeaker 201 which outputs wideband speech into a space; the microphone 202 which collects speech in the space; the speech recognition unit 203 which recognizes the user speech among the speech collected by the microphone 202; the downsampler 205 which downsamples a speech signal, which is an electric signal of the speech to be output from the loudspeaker 201, to have a narrower bandwidth; and the echo canceller 204 which estimates an echo component which is the speech collected by the microphone 202 among the speech output from the loudspeaker 201, based on the downsampled speech signal, and cancels the estimated echo component from the speech collected by the microphone 202. The speech recognition unit 203 recognizes the user speech by recognizing speech from which the echo canceller 204 has removed the echo component By causing the echo canceller 204 to estimate and cancel the echo component based on the output signal of the downsampler 205 in this way, the speech intended by the user can be recognized accurately without being interrupted by the speech signal output by the device including the speech recognition function 2 itself.

Moreover, by including the downsampler 205 in a stage prior to the echo canceller 204 to cancel the signal having a bandwidth unnecessary for speech recognition, the amount of computation by the echo canceller 204 can be significantly reduced without reducing the recognition rate of the user speech by the speech recognition unit 203. This is because, as described above, the amount of computation by the echo canceller 204 is proportional to the square of the reproduction band of the input signal.

In other words, the device including the speech recognition function 2 according to Embodiment 2 can accurately perform speech recognition with less amount of computation.

Moreover, the device including the speech recognition function 2 according to Embodiment 2 includes the command control unit 206 which issues a command for controlling the device including the speech recognition function 2 based on the speech recognized by the speech recognition unit 203. The speech recognition unit 203 recognizes speech from which the echo canceller 204 has canceled the echo component, and prohibits the command control unit 206 from issuing a command based on the echo component.

Accordingly, the device including the speech recognition function 2 according to Embodiment 2 reduces an incorrect operation of the device including the speech recognition function 2 caused by recognizing the speech output by the device 2 itself without the user's intent.

Variation of Embodiment 2

In Embodiment 2, the speech signal generated by the TV which is the device including the speech recognition 2 is a monaural signal. In recent years, it is common that the speech signal is a stereo signal. Furthermore, multichannel broadcasting of 5.1 ch and the like have started. A description will be given, as Variation of Embodiment 2, of a device including a speech recognition function when the signal generated by the TV is a multi-channel signal, with an example where the number of channels is 2 ch.

Figure 5:
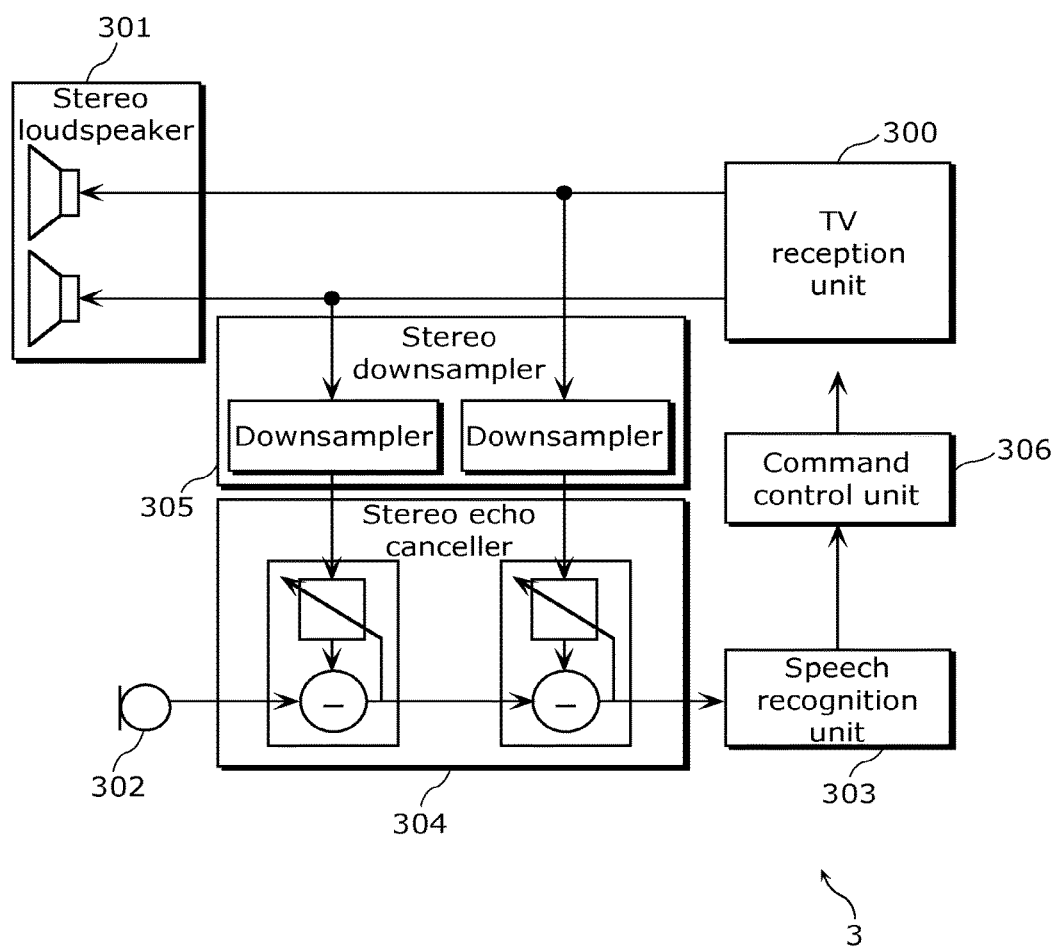
FIG. 5 is a block diagram illustrating a configuration of a device including a speech recognition function according to Variation of Embodiment 2.

FIG. 5 is a block diagram illustrating a configuration of a device including a speech recognition function according to Variation of Embodiment 2. A device including a speech recognition function 3 illustrated in FIG. 5 is different from the device including the speech recognition function 2 according to Embodiment 2 in that the speech signal output from the loudspeaker is a multi-channel signal. In FIG. 5, the TV reception unit 300, the microphone 302, the speech recognition unit 303, and the command control unit 306 are the same as the TV reception unit 200, the microphone 202, the speech recognition unit 203, and the command control unit 206 in FIG. 3.

In this way, the device including the speech recognition function 3 according to Variation of Embodiment 2 is different from the device including the speech recognition function 2 according to Embodiment 2 in that a stereo loudspeaker 301, a stereo downsampler 305, and a stereo echo canceller 304 are included for a stereo speech signal, instead of the loudspeaker 201, the downsampler 205, and the echo canceller 204 for a monaural speech signal.

Specifically, the stereo loudspeaker 301 includes loudspeakers each corresponding to a different one of channels of each stereo speech signal of a TV signal, and converts each stereo speech signal into speech and outputs the converted speech into a space. The stereo echo canceller 304 includes two echo cancellers each corresponding to a different one of the channels of each stereo speech signal. The stereo echo canceller 304 receives the stereo speech signal downsampled by the stereo downsampler 305, and cancels an echo component to be output from the stereo loudspeaker 301, from the signal collected by the microphone 302. The method thereof may be any known methods. The stereo downsampler 305 downsamples a wideband speech signal of each channel output from the stereo loudspeaker 301, and converts the signal into a signal having a narrower bandwidth.

Here, when the number of channels is N (N=2 in Variation of Embodiment 2), the rate of downsampling of the input speech signal by the stereo downsampler 305 is desirably $(1/N)^{0.5}$ or less. In other words, when the number of loudspeakers is N (N is an integer greater than or equal to 2), it is desirable that the stereo downsampler 305 downsamples the input speech signal by $(1/N)^{0.5}$ or less. Accordingly, the device including the speech recognition function 3 according to Variation of Embodiment 2 is expected to obtain the advantageous effects as described below.

The amount of computation by each echo canceller included in the stereo echo canceller 304 is proportional to the square of reproduction band of the received speech signal. Hence, by causing the stereo downsampler 305 to downsample the speech signal by $(1/N)^{0.5}$, the amount of computation by the stereo echo canceller 304 is $((1/N)^{0.5})^{2}=1/N$ per channel, resulting in $1/N*N=1$ as a whole. In other words, the amount of computation by each echo canceller in the stereo echo canceller 304 is $1/N$, and the amount of computation by the stereo echo canceller 304 is $1/N*N=1$. Specifically, even if the number of channels increases, the amount of computation assigned to the stereo echo canceller 304 can be kept to a predetermined level or less.

In other words, the device including the speech recognition function 3 according to Variation of Embodiment 2 causes the stereo downsampler 305 to downsample a speech signal by $(1/N)^{0.5}$. With this, even when the speech signal is a multi-channel signal, the device including the speech recognition function 3 can accurately recognize the speech spoken by the user without being interrupted by the speech signal output by the device 3 itself, with the amount of computation equal to or less than that required for processing a monaural-channel signal. Specifically, the device including the speech recognition function 3 according to Variation of Embodiment 2 includes the stereo loudspeaker 301 which outputs a stereo speech signal. The device 3 can accurately recognize the speech spoken by the user without increasing the amount of computation compared to that required by the device including the speech recognition function 2 according to Embodiment 2 which includes the loudspeaker 201 which outputs a monaural speech signal.

In Variation of Embodiment 2, the example has been described where the speech signal processed by the device including the speech recognition function 3 is a stereo (2.0 ch) signal, but the channel of the speech signal is not limited to the example. The channel of the speech signal may be, for example, 5.1 ch which has a larger number of channels than that of the stereo (2.0 ch) signal.

Although the devices including the speech recognition function according to one or more embodiments have been described based on the embodiments and variation, the present disclosure is not limited to the embodiments and variation. Various modifications to the embodiments and variation that can be conceived by those skilled in the art, and forms configured by combining structural elements in different embodiments and variation without departing from the teachings of the present disclosure may be included in the scope of one or more embodiments of the present disclosure.

For example, in each embodiment and variation, the TV has been described as an example of a device including a speech recognition function. However, the device including the speech recognition function is not limited to the TV, but may be a recording and reproducing device which has recorded TV broadcast, or a device which outputs speech such as a digital versatile disc (DVD) player, a blu-ray (registered trademark) (BD) player, or a compact disc (CD) which reproduces media on which video content or music content has been recorded).

In the device including the speech recognition function 2 according to Embodiment 2 illustrated in FIG. 3, it looks like, among two-system speech signals input to the echo canceller 204, a speech signal directed to the echo canceller 204 from the path to the loudspeaker 201 is downsampled, whereas a speech signal input from the microphone 202 to the echo canceller 204 is not downsampled. However, as described in Embodiment 2, the sampling frequency of the microphone 202 is the same as the sampling frequency of the output signal of the downsampler 205. In other words, in Embodiment 2, the speech signal input to the echo canceller 204 from the microphone 202 is downsampled by the microphone 202.

The frequency band of the speech signal after being downsampled by the microphone 202 and the downsampler 205 is not limited to 8 kHz described above. For example, the sampling frequency of the speech signal output from the loudspeaker 201 is 48 kHz, the sampling frequency of the microphone 202 is 16 kHz, and the downsampler 205 downsamples the frequency band of the input speech signal to ⅓. The frequency band of the output signal of the downsampler 205 may be 16 kHz. In this case, too, the sampling frequency of the microphone 202 is 16 kHz, which is the same as the frequency band of the output signal of the downsampler 205.

Figure 6:
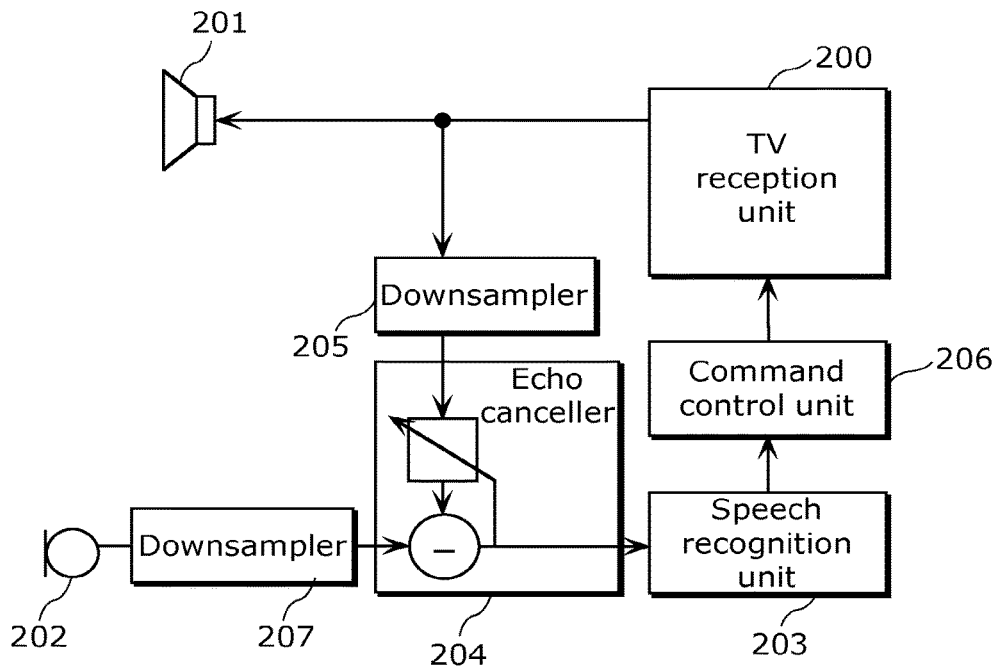
FIG. 6 is a block diagram illustrating a configuration of a device including a speech recognition function including a downsampler which downsamples an output to be provided from a microphone.

Moreover, in the device including the speech recognition function 2 according to Embodiment 2, the sampling frequency of the microphone 202 is the same as the sampling frequency of the downsampler 205. However, the sampling frequency of the microphone 202 may be higher than the sampling frequency of the downsampler 205. For example, it may be that the sampling frequency of the microphone 202 is 24 kHz, and the sampling frequency of the downsampler 205 is 16 kHz. In this case, as illustrated in FIG. 6, the device including the speech recognition function may further include a downsampler 207 which downsamples an output signal from the microphone 202. The downsampler 207 may be caused to downsample the speech signal collected by the microphone 202 from 24 kHz to 16 kHz so that the frequency band of the output signal of the downsampler 205 is the same as the sampling frequency of the microphone 202 (that is, the frequency band of the speech signal collected by the microphone 202).

For example, part or all of the structural elements included in each device above may be typically implemented as a large scale integration (LSI) which is an integrated circuit. These structural elements may be individual chips or partially or totally contained on a single chip.

The term "LSI" is adopted herein, but this may also be referred to as "IC," "system LSI," "super LSI," or "ultra LSI" depending on differing extents of integration.

The method of implementing integrated circuitry is not limited to LSI, and implementation by means of dedicated circuitry or a general-purpose processor may also be used. It is also possible to use a field programmable gate array (FPGA) or a reconfigurable processor where connections and settings of circuit cells in an LSI can be reconfigured.

Further, if a new integrated circuit implementation technology comes out to replace LSI as a result of the development of semiconductor technology or a derivative other technology, naturally functional blocks may be integrated using that technology. For example, application of biotechnology is possible.

Figure 7:
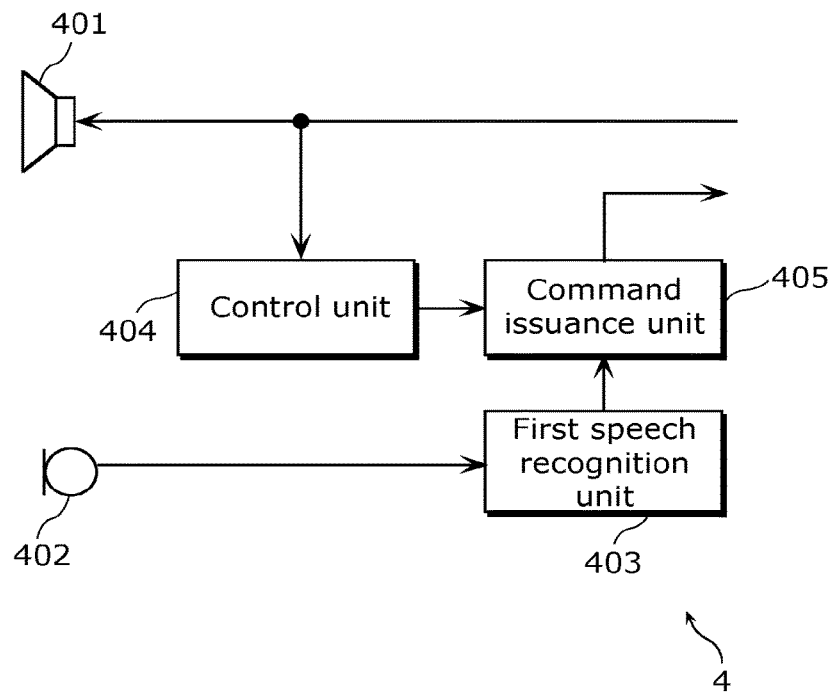
FIG. 7 is a block diagram illustrating another example of the configuration of the device including the speech recognition function according to Embodiment 1.

Moreover, the configuration of the device including the speech recognition function according to Embodiment 1 is not limited to the one illustrated in FIG. 1, but may be at least the one illustrated in FIG. 7. In other words, a device including a speech recognition function 4 may be a device which includes a speech recognition function which recognizes user speech which is speech from a user. The device 4 may include: a loudspeaker 401 which outputs speech into a space; a microphone 402 which collects speech in the space; a first speech recognition unit 403 which recognizes the speech collected by the microphone 402; a command issuing unit 405 which issues a command for controlling the device 4 based on the speech recognized by the first speech recognition unit 403; and a control unit 404 which prohibits the command issuing unit 405 from issuing the command, based on the speech to be output from the loudspeaker 401.

With such a configuration, the device including the speech recognition function 4 can prevent an incorrect operation of the device 4 caused due to the speech output by the device 4 itself in a similar manner to the device including the speech recognition function 1 illustrated in FIG. 1.

Figure 8:
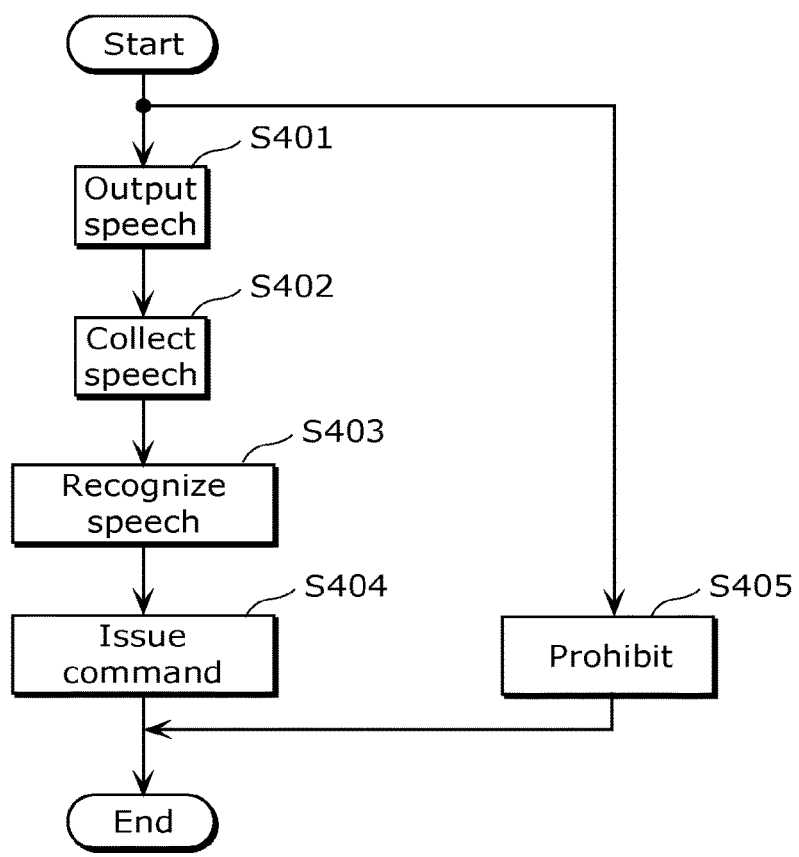
FIG. 8 is a flowchart illustrating an example of operations of the device including the speech recognition function illustrated in FIG. 7.

As illustrated in FIG. 8, the device including the speech recognition function 4 performs a speech recognition method which recognizes user speech which is speech from a user. The method includes: outputting (S401) speech into a space; collecting (S402) speech in the space after the outputting (S401); recognizing (S403) the speech collected in the collecting (S402); issuing (S404) a command for controlling a device including a speech recognition function, based on the speech recognized in the recognizing (S403); and prohibiting (S405) the command issuing unit 405 from issuing the command, based on the speech to be output in the outputting (S401).

Figure 9:
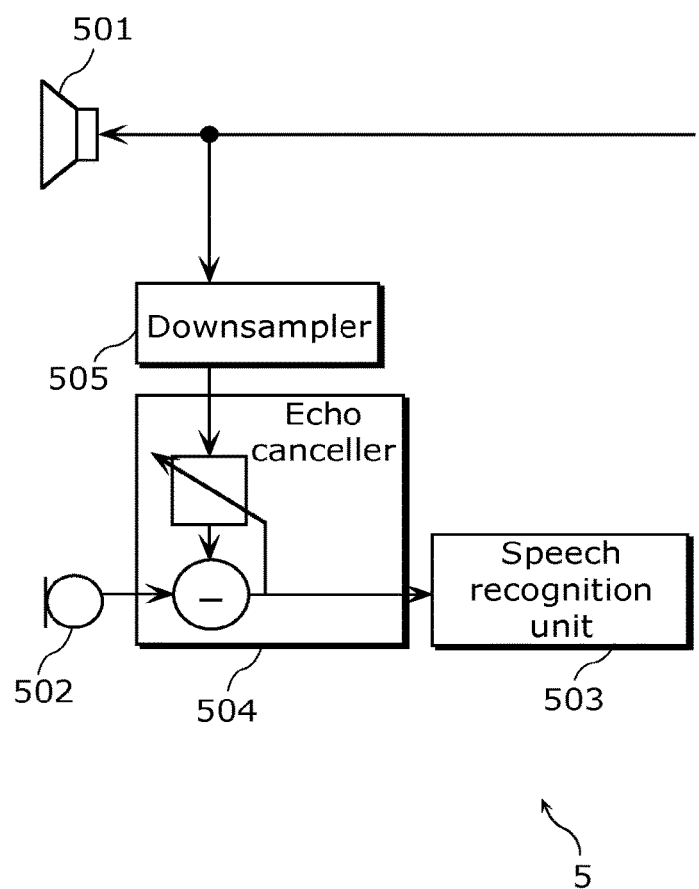
FIG. 9 is a block diagram illustrating another example of the configuration of the device including the speech recognition function according to Embodiment 2.

Moreover, the configuration of the device including the speech recognition function according to Embodiment 2 is not limited to the one illustrated in FIG. 3, but may be at least the one illustrated in FIG. 9. In other words, a device including a speech recognition function 5 may be a device including a speech recognition function which recognizes user speech which is speech from a user. The device 5 may include: at least one loudspeaker 501 which outputs speech into a space; a microphone 502 which collects speech in the space; a speech recognition unit 503 which recognizes the user speech among the speech collected by the microphone 502; a downsampler 505 which downsamples a speech signal, which is an electric signal of the speech to be output from the loudspeaker 501, to have a narrower bandwidth; and an echo canceller 504 which estimates an echo component which is speech collected by the microphone 202 among the speech output from the loudspeaker 501, based on the downsampled speech signal, and cancels the estimated echo component from the speech collected by the microphone 502. The speech recognition unit 503 may recognize the user speech by recognizing speech from which the echo canceller 504 has canceled the echo component.

With such a configuration, the device including the speech recognition function 5 can accurately recognize speech spoken by the user without being interrupted by the speech output by the device 5 itself, in a similar manner to the device including the speech recognition function 2 illustrated in FIG. 3. Additionally, in a similar manner to the device including the speech recognition function 2, accurate speech recognition can be performed with reduced amount of computation.

Figure 10:
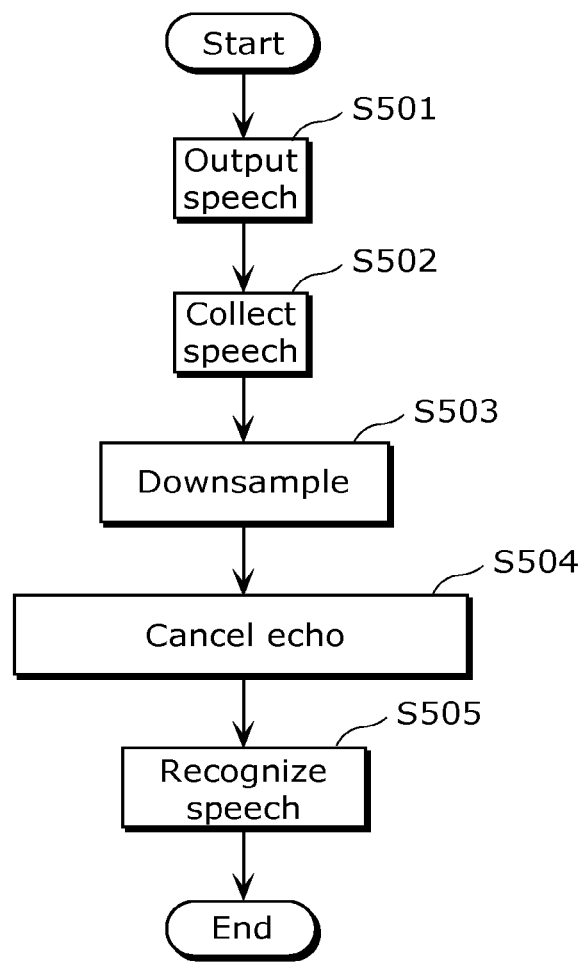
FIG. 10 is a flowchart illustrating an example of operations of the device including the speech recognition function illustrated in FIG. 9.

As illustrated in FIG. 10, the device including the speech recognition function 5 performs a speech recognition method which recognizes user speech which is speech from a user. The method includes: outputting (S501) speech into a space; collecting (S502) speech in the space after the outputting (S501); recognizing (S505) the user speech among the speech collected in the collecting (S502); downsampling (S503) the speech signal, which is an electric signal of the speech to be output in the outputting (S501), to have a narrower bandwidth (S503); and estimating an echo component which is the speech collected in the collecting (S502) among the speech output in the outputting (S501), based on the downsampled speech signal, and canceling the estimated echo component from the speech collected in the collecting (S502) (S504). In the recognizing (S505), the user speech is recognized by recognizing speech from which the echo component have been canceled in the cancelling (S504).

Each of the structural elements in each of the above-described embodiments may be configured in the form of an exclusive hardware product, or may be realized by executing a software program suitable for the structural element. The structural elements may be implemented by a program execution unit such as a CPU or a processor which reads and executes a software program recorded on a recording medium such as a hard disk or a semiconductor memory. A software program in which the device including the speech recognition function according to each of the above embodiments is implemented is as follows.

More specifically, the program for implementing the device including the speech recognition function and the like according to Embodiment 1 causes a computer to perform the speech recognition method as illustrated in FIG. 8.

Moreover, the program for implementing the device including the speech recognition function and the like according to Embodiment 2 causes a computer to perform the speech recognition method as illustrated in FIG. 10.

Although only some exemplary embodiments of the present invention have been described in detail above, those skilled in the art will readily appreciate that many modifications are possible in the exemplary embodiments without materially departing from the novel teachings and advantages of the present invention. Accordingly, all such modifications are intended to be included within the scope of the present invention.

INDUSTRIAL APPLICABILITY

The device including the speech recognition function according to the present disclosure can accurately perform speech recognition without being interrupted by the speech output by the device itself. Hence, the device can be widely applied to devices which output speech such as a TV, a recording and reproduction device, or a DVD/BD/CD player.

The invention claimed is:

1. A device including a speech recognition function which recognizes user speech which is speech from a user, the device comprising:
    a loudspeaker which outputs speech to a space;
    a microphone which collects speech in the space;
    a speech output unit configured to output a speech signal;
    a first speech recognition unit configured to recognize the speech collected by the microphone;
    a first control unit configured to generate a command for controlling the speech output unit, based on the speech recognized by the first speech recognition unit; and
    a second control unit configured to permit or prohibit issuance of the command to the speech output unit, based on the speech signal,
    wherein the second control unit includes a second speech recognition unit configured to analyze the speech signal to recognize the speech to be output from the loudspeaker, and
    the second control unit is configured to determine whether or not the speech recognized by the second speech recognition unit matches a predetermined keyword, and when the speech recognized by the second speech recognition unit matches the predetermined keyword, prohibit the issuance of the command and when the speech recognized by the second speech recognition unit does not match the predetermined keyword, permit issuance of the command.

2. A method of recognizing user speech using a device including a speech recognition function, the user speech being speech from a user, the device including a loudspeaker, a microphone, two speech recognition units, a speech output unit and a control unit, the method comprising:
    inputting a first speech signal from the speech output unit into the loudspeaker, and outputting a first speech corresponding to the first speech signal into a space utilizing the loudspeaker;
    collecting a second speech signal utilizing the microphone, the second speech signal including the first speech and user speech;
    recognizing by a first speech recognition unit, the first speech signal;
    recognizing, by a second speech recognition unit, the second speech signal;
    generating, by the control unit, a command for controlling the device, based on the second speech signal recognized by the second speech recognition unit;
    determining, by the control unit, whether or not the recognized first speech signal by the first speech recognition unit matches a first predetermined keyword;
    when it is determined that the recognized first speech signal matches the first predetermined keyword, prohibiting issuance of a command corresponding to the user speech of the recognized second speech signal; and
    when it is determined that the recognized first speech signal does not match the first predetermined keyword, issuing the command corresponding to the user speech of the recognized second speech signal to control the device.

* * * * *